United States Patent [11] 3,609,168

[72] Inventors Raymond Bourdon;
 Sylvie Ranisteano, both of Paris, France
[21] Appl. No. 659,001
[22] Filed Aug. 8, 1967
[45] Patented Sept. 28, 1971
[73] Assignee Societe d'Etudes, de Recherches et
 d'Applications, Scientifiques et Midicales
 E.R.A.S.M.E. (Societe Anonyme Francaise)
 Paris, France
[32] Priority Aug. 12, 1966
[33] Great Britain
[31] 36306/66

[54] THIADIAZEPINES
 3 Claims, No Drawings
[52] U.S. Cl. ...................................................... 260/327 R,
 260/268 R, 260/479 R, 260/516, 260/521 A,
 260/558 S, 260/562 P, 260/562 R, 424/275,
 424/317
[51] Int. Cl. ........................................................ C07d 93/00
[50] Field of Search .......................................... 260/327 B,
 327

[56] References Cited
OTHER REFERENCES

Chrzaszczewska et al. Chem. Abstracts, Vol. 23 (1929), pp. 1629

Loudon Jour. Chem. Soc. (1963), pp. 5497–5502

Rauch et al. Organic Name Reactions, Wiley, New York (1964), pp. 173–4.

Primary Examiner—James A. Patten
Attorney—Bacon & Thomas

ABSTRACT: The invention comprises derivatives of 2,7-dihydro-3,6-diphenyl-thiadiazepine; these derivatives have pharmaceutical interest as choleretics, though the parent compound has previously shown no medical properties. Preparation of the derivatives constituting the novel compounds of the invention involves four steps, comprising fixation of desired substituents on an aromatic ring, acylation, fixation of a sulfur atom and cyclization. Detailed examples of this preparation are given, together with information on the chemical and medical properties of the compounds.

THIADIAZEPINES

The synthesis of 2,7-dihydro-3,6-diphenylthadiazepine was carried out in 1963 by Loudon by the action of hydrazine hydrate on a solution of diphenyl sulfide. This product is insoluble in water and has not previously shown any special medical properties and the applicants have surprisingly discovered that substituted compounds, containing the same basic ring structure, have proved to be of interest because they have choleretic activity.

The present invention relates to products of the formula:

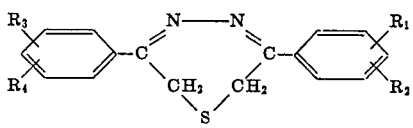

in which:

$R_1$ and $R_3$ are the same or different and each represents a hydrogen atom or a hydroxy group;

$R_2$ and $R_4$ are the same or different and each represents a halogen atom, an oxyalkylcarboxylic or acylamino radical, an esterified carboxylic radical or carboxyamino radical;

and products obtained by salification or esterification of the compounds defined above.

When $R_1$ and $R_3$ are hydrogen atoms, $R_2$ and $R_4$ are oxyalkylcarboxylic or acylamino radicals and are preferably located in the paraposition with respect to the carbon atom connected to the heterocycle; when $R_1$ and $R_3$ are hydroxy groups, they are located in the orthoposition or paraposition with respect to the carbon atom connected to the heterocycle and $R_2$ and $R_4$ are esterified carboxylic or carboxyamino radicals or halogen atoms and are located in the metaposition with respect to the carbon atom connected to the heterocycle.

The preparation of products according to the invention is carried out according to the following scheme:

1. Fixation on the aromatic ring of the desired substituent or substituents,
2. Acylation of the aromatic ring carrying the desired substituent or substituents, this acylation being effected:
   either by the Friedel-Crafts reaction, namely the action of an omega-halogenated acid chloride on the product previously prepared, in the presence of aluminum chloride;
   or by the Friess reaction, when the aromatic ring contains a phenol group, consisting of:
   a. preparation of a halogenated ester of phenol;
   b. transposition of the product obtained at (a) into a halogenated ketone, in the presence of aluminum chloride.
3. Fixation of a sulfur atom between two molecules obtained under (2), this fixation being effected by means of sodium sulfide.
4. Cyclization by the action of hydrazine hydrate on the diketone obtained under (3).

This cyclization has been effected in the presence of glacial acetic acid at a temperature of 60° to 90° C. It produces a derivative of dihydrodiphenylthiadiazepine in yields of 70 to 99 percent.

5. Salification of the product obtained.

The following examples are given by way of illustration only and show preparation of products according to the invention.

EXAMPLE 1

2,7-dihydro-3,6-[4',4''-oxyacetic]-diphenyl-thiadiazepine-4,5

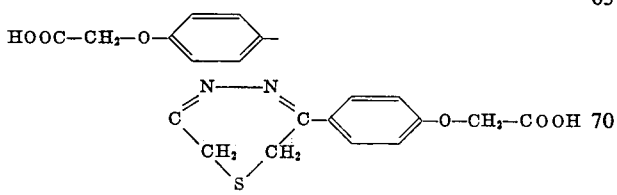

Preparation of this product was carried out as follows:

1. Preparation of phenoxy-acetic acid.

Into a 1,000 ml. flask provided with a reflux condenser, there were introduced:
KOH pastilles 56 g.
Distilled water 400 ml.
Pure phenol 19 g.
Mono-chloracetic acid 37.6 g.
The mixture was kept under reflux for 8 hours.
The cooled solution was acidified with dilute hydrochloric acid. The precipitate obtained was dried, washed with water and recrystallized from water. Melting point: 98° C.

2. Acylation of phenoxy-acetic acid.

Into a three-neck flask provided with an electric agitator, a reflux condenser and a bromine dropper, there were introduced:
Phenoxy-acetic acid 25 g.
Carbon sulfide 100 ml.
Anhydrous aluminum chloride 125 g.
and then dropwise with agitation:
Chloracetyl chloride 75 g.
When all the reactants had been introduced, the mixture was kept under reflux for 45 minutes. After cooling, the carbon sulfide was distilled off under vacuum. The residue was hydrolyzed with iced water containing hydrochloric acid. The precipitate was dried and washed with water and recrystallization was effected from water. Melting point: 143° C. Yield: 50 percent.

3. Fixation of a sulfur atom.

A solution of sodium sulfide was prepared by saturation with $H_2S$ of a solution containing 31 mg./ml. of sodium in anhydrous ethyl alcohol and then heating this solution under reflux in the presence of an equal quantity of dodium alcoholate for 1 hour. Anhydrous ethyl alcohol was then added to the solution to make 500 ml., to dissolve the deposit of $Na_2S$, and was then stored in a refrigerator. The final solution contained 15 mg./ml. of Na.

In a three-neck flask provided with an electric agitator, a condenser and a bromine dropper, there were introduced:
4-chloro-aceto-phenoxyacetic acid 4.60 g.
Anhydrous ethyl alcohol 220 ml.
then dropwise with agitation:
$Na_2S$ in alcoholic solution at 15 mg./ml. of Na 64 ml.
This operation should be effected between 0° and 5° C., the flask being immersed in ice.

The mixture was allowed to stand for 2 hours at the laboratory temperature. The precipitate formed was dried and dissolved in water. The alkaline solution obtained was acidified with dilute hydrochloric acid. The precipitate obtained was dried, washed with water and was recrystallized from ethyl alcohol and water. Melting point: 210° C. Yield: 90 percent.

Analysis

| | C% | H% | S% |
|---|---|---|---|
| Theory | 57.40 | 4.30 | 7.60 |
| Found | 57.28 | 4.22 | 7.81 |

Solubility: slightly soluble in alcohols and soluble in an aqueous solution of sodium bicarbonate.

Reaction with sodium nitroprussiate: purple-violet coloration of a bicarbonate solution of the acid after the addition of caustic soda.

4. Cyclization

Into a four-neck flask provided with an electric stirrer, a condenser, a bromine dropper and a thermometer, there were introduced:
Di-(4'4''-oxyacetic)-phenacyl sulfide 5 g.
Glacial acetic acid 100 ml.
and on heating to 60° C. there were then introduced in drops:
Hydrazine hydrate 5 ml.

The temperature was taken to 80° C. and maintained for 10 minutes, the reaction mixture then being allowed to cool. The product crystallized. This was dried and washed with water.

To effect recrystallization, the crystals were dissolved in the minumum of dimethyl-formamide and then isopropyl alcohol was added. It crystallized in fine needles. Melting point: 245° C. Yield: 70 percent.

The product obtained had a melting point of 245° C. Its analysis gave the following results:

|  | C% | H% | N% | S% |
|---|---|---|---|---|
| Theory: | 58.20 | 4.40 | 6.70 | 7.70 |
| Found: | 57.08 | 4.30 | — | — |

5. Salification
  a. Ethanolamine salt:
    Acid  4.14 g. (0.01 mole)
    Ethanolamine  1.20 g. (0.02 mole)
    Distilled water  minimum quantity for dissolution.

Addition of absolute alcohol was made until there was a slight turbidity with the mixture hot. Crystallization was effected by cooling and the product was dried. Melting point: 246° C. Solubility in water: 8 percent.
  b. Hydroxy-ethylpiperazine salt:
    Acid  4.14 g. (0.01 mole)
    Hydroxy-ethylpiperazine  2.60 g. (0.02 mole)

Crystallization was effected from alcohol containing ether. Melting point: 185° C. Solubility in water: 16 percent.

Using the same conditions, there were obtained:
  by using phenoxypropionic acid, the compound 2,7-dihydro-3,6-[4,4'-oxypropionic]-diphenyl-thiadiazepine-4,5 was obtained, the melting point of which is 188° C.

Treatment of this product with hydroxy-ethylpiperazine produced a salt having a melting point of 177° C. and a solubility in water of 10 percent.

By using phenoxy-isobutyric acid, the compound 2,7-dihydro-3,6-(4,4'-oxyisobutyric)-diphenyl-thiadiazepine-4,5 was obtained, having a melting point of 212° C. and having an analysis giving the following results:

|  | C% | H% | N% | S% |
|---|---|---|---|---|
| Theory: | 60.40 | 5.70 | 6.20 | 6.90 |
| Found: | 60.05 | 5.67 | 6.23 | 6.75 |

Treatment of this product with hydroxy-ethylpiperazine produced a salt having a melting point of 175° C. and a solubility in water of 20 percent.

EXAMPLE 2

2,7-dihydro-3,6-(p,p'-acetylamino)-diphenyl-thiadiazepine-4,5

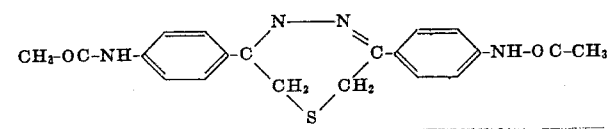

Acetanilide was treated with chloracetyl chloride under the following conditions:

Into a three-neck flask provided with an electric agitator, a reflux condenser and a bromine dropper, there were introduced:
  Dry acetanilide  6.06 g. (0.05 mole)
  $CS_2$  33 ml.
and then slowly via the bromine dropper with agitation:
  Chloracetyl chloride  6 ml.
and finally, with vigorous agitation and in small amounts:
  Anhydrous aluminum chloride  18 g.
when all the reactants had been introduced, the mixture was held for 1 hour at 55°–60° C. and then allowed to stand for 3 hours at the laboratory temperature.

The carbon sulfide was eliminated by distillation under vacuum and the mixture was poured into iced water containing hydrochloric acid. The precipitate which was formed was dried and washed with water and then with alcohol. Melting point: 215° C. Yield: 50 percent.

Then a sulfur atom was fixed to two molecules of the chlorinated ketone so prepared, by reaction with sodium sulfide:

The solution of sodium sulfide was prepared by saturation with $H_2S$ of a solution of 31 mg./ml. of sodium in anhydrous ethyl alcohol and then by heating under reflux of this solution in the presence of an equal quantity of sodium alcoholate for 1 hour. The solution was then treated with anhydrous ethyl alcohol to make 500 ml., to dissolve a deposit of $Na_2S$, and then stored in the refrigerator. This final solution contained 15 mg./ml. of Na.

Into a 2 liter three-neck flask, provided with an electric agitator, a condenser and a bromine dropper, there were introduced:
  p-Acetylamino-chloracetophenone  45 g.
  Cellosolve  1,530 ml.
and then in drops with agitation:
  $Na_2S$ in alcoholic solution, 15 mg./ml. of Na  290 ml.

The mixture was heated to 85° C. with agitation for 8 hours. It was then dried, washed with acetic acid and then with distilled water and redried. Recrystallization was effected from formamide. Melting point: 263° C. Yield: 70 percent.

The product obtained was then cyclized by the following reaction:

Into a four-neck flask provided with an electric agitator, a condenser, a bromine dropper and a thermometer, there were introduced:
  Di-(p,p'-acetylamino)-phenacyl sulfide  15 g.
  Dimethylsulphoxide  50 ml.
  Acetic acid  300 ml.
the contents were heated to 80° C. and there were then introduced in drops:
  Hydrazine hydrate 98 percent  15 ml.
and the temperature was maintained for 10 minutes at 80°–90° C. and then the hot solution was filtered. The product crystallized on cooling. It was recrystallized from acetic acid and dimethylsulphoxide.

The desired product was thus obtained in a yield of 80 percent having a melting point of 300° C. and being insoluble in water, alcohols, ether and hydrocarbons, but soluble in dimethylsulphoxide and acetic acid.

EXAMPLE 3

2,7-dihydro-3,6-(3',3''-carboxymethyl-4',4''-hydroxy)-diphenyl-thiadiazepine-4,5.

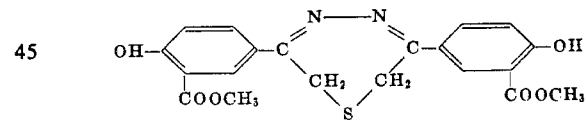

The starting material used was methyl salicylate which was acylated by a Friedel-Crafts reaction in the following manner:

Into a three-neck flask provided with an electric agitator, a reflux condenser and a bromine dropper, there were introduced:
  Methyl salicylate  28.5 g.
  Carbon sulfide  155 ml.
and then, over a few minutes in small amounts with stirring:
  Anhydrous aluminum chloride  50 g. and finally, slowly from the bromine dropper with vigorous stirring:
  Chloracetyl chloride  25 g.

When all the reactants were introduced, the mixture was maintained for 2 hours at 55°–60° C. and then agitated at laboratory temperature until the end of evolution of hydrogen chloride.

The carbon sulfide was eliminated by distillation under vacuum and the mixture was poured into iced water containing hydrochloric acid. The precipitate was dried, washed with water and recrystallized from aqueous methanol. Melting point: 105° C. Yield: 50 percent.

Then two molecules of the compound obtained were connected by a sulfur atom according to the following process:

The solution of sodium sulfide was prepared by saturation with $H_2S$ of a solution of 31 mg./ml. of sodium in anhydrous ethyl alcohol followed by heating under reflux of this solution in the presence of an equal quantity of sodium alcoholate for 1 hour. The solution was then added to anhydrous ethyl alcohol to make 500 ml., to dissolve the deposit of Na₂S, and was then stored in the refrigerator. This final solution contained 15 mg./ml. of Na.

In a 1,000 ml. three-neck flask provided with an electric agitator, a condenser and a bromine dropper, there were introduced:

methyl-p-chloroacetosalicylate 4.30 g.
anhydrous methyl alcohol 400 ml.

The flask was immersed in an ice bath in order to obtain an internal temperature of 0° to 5° C. and there was then added dropwise with stirring:

Na₂S in alcoholic solution 15 mg./ml. of Na 28 ml.

Formation of a whitish precipitate occurred rapidly. The mixture was then agitated for 1 hour after the end of addition of the sulfide. The product was dried and washed with water and then recrystallized from ethylcellosolve. Melting point: 175° C. Yield: 90 percent.

Finally, the product was cyclized:

Into a four-neck flask provided with an electric agitator, a condenser, a bromine dropper and a thermometer, there were introduced:

Di-(3',3''-carboxymethyl-4'4''-hydroxy)-phenacyl sulfide 1 g.
Acetic acid 30 ml.

After heating to complete dissolution (80° C.), there were then introduced dropwise:

Hydrazine hydrate 98 percent 2 ml.

The mixture was then maintained for 10 minutes at 80°–90° C. and then allowed to cool. The product crystallized on cooling. It was recrystallized from dimethylsulphoxide and alcohol.

A compound was obtained having the following physicochemical properties:
Molecular weight: 414
M.P.: 245° C.
Analysis:

| | C% | H% | N% | S% |
|---|---|---|---|---|
| Theory: | 58 | 4.3 | 6.7 | 7.7 |
| Found: | 57.9 | 4.35 | 6.66 | 6.86 |

Solubilities:
Insoluble in water, methanol, ethanol and acetic acid.
Soluble in ethylcellosolve.

By using salicylamide as the starting material, there was obtained by the same sequence of reactions: 2,7-dihydro-3,6-(3',3''-carboxyamido-4',4'')-diphenyl-thiadiazepine-4,5, which melts at 322° C.

EXAMPLE 4

2,7-dihydro-3,6-(2',2''-hydroxy-5',5''-chloro)-diphenyl-thiadiazepine-4,5.

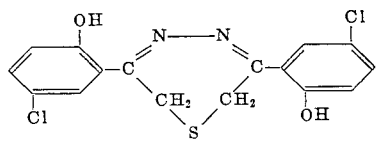

Preparation of this product necessitated the acylation of p-chlorophenol by chloracetyl chloride according to the Friess reaction:

a. Esterification of p-chlorophenol by chloracetyl chloride.

Into a three-neck flask provided with an electric agitator, a reflux condenser and a bromine dropper, there were introduced:

p-chlorophenol 40 g.
and then, dropwise with stirring:
chloracetyl chloride 50 g. (33.5 ml.).

The mixture was heated in an oil bath at 140° C. (internal temperature) with agitation for 5 hours. It was then distilled under vacuum with a column. The product passed over at 147°–152° C./4mm. Hg. Melting point: 36° C.

b. Friess transposition of the preceding ester:

Into a three-neck flask provided with an electric agitator, a reflux condenser and a bromine dropper, there were introduced.

preceding chlorinated ester 41 g.
and then, in small amounts with agitation:
aluminum chloride 117 g.

The reaction was very exothermic. At the end of the addition, the mixture was heated in an oil bath at 150° C. for 5 hours. The mixture was then poured into iced water containing hydrochloric acid.

The precipitate was dried and purified by vapor entrainment, a white crystalline product being obtained. Melting point: 65° C. Yield: 30 percent.

Then, as in the preceding examples, the product obtained was treated with sodium sulfide and cyclized with hydrazine hydrate.

A compound was obtained which was insoluble in water, methanol and cellosolve, but soluble in dimethylsulph-oxide, its melting point being 300° C. and its analysis giving the following results:

| | C% | H% | N% | S% | Cl% |
|---|---|---|---|---|---|
| Theory: | 52.3 | 3.3 | 7.6 | 8.7 | 19.4 |
| Found: | 51.8 | 3.25 | 7.6 | 8.4 | 19.2 |

An example of the choleretic activity of the products of the invention is provided by the following results obtained with rats:

Rats of the Wistar strain were used, having an average weight of 200 g.

The animals were left unfed until the evening. A small aperture was made by laparatomy and the choledoch was catheterized with a small canulla of plastic material. The bile was extracted for about 30 minutes without being recovered. It was then recovered over 1 hour, this first recovery constituting the time base. Then the substance under examination was administered and the bile was recovered over 3 or 4 hours by observing the quantity which had been extracted at the end of each hour.

For each hour, the variation percent in the excretion was calculated with respect to the time base recovery.

The following products have been administered to the animals:

A. di-(4',4''-oxyacetic)-phenacyl sulfide solified with ethanolamine. This product is an intermediate obtained, before cyclization, by the synthesis of the invention. It is described in example 1.

B. 2,7-dihydro-3,6-(4',4''-oxyacetic)-diphenyl-thiadiazepine-4,5 salified by ethanolamine.

C. 2,7-dihydro-3,6-(4'4''-oxyisobutyric)-diphenyl-thiadiazepine-4,5 salified by hydroxyethlpiperazine.

The results obtained as set out in the following table.

INTRAVENOUS ADMINISTRATION, PERCENT

| | 20 mg./kg. | | | | 50 mg./kg. | | 100 mg./kg. | | 200 mg./kg. | |
|---|---|---|---|---|---|---|---|---|---|---|
| | 1 h. | 2 h. | 3 h. | 4 h. | 1 h. | 2 h. | 1 h. | 2 h. | 1 h. | 2 h. |
| B | | | | | 44 | 10 | 139 | 59 | 101 | 35 |
| A | | | | | 12.6 | 8.7 | | | 72 | 69 |
| C | 61 | 30 | 26.5 | 30.2 | | | | | | |

ORAL ADMINISTRATION, PERCENT

| | 300 mg./kg. | | 500 mg./kg. | | | | 1,000 mg./kg. | |
|---|---|---|---|---|---|---|---|---|
| | 1 h. | 2 h. | 1 h. | 2 h. | 3 h. | 4 h. | 1 h. | 2 h. |
| B | 0 | 0 | | | 2 h., 1% | | 0 | 0 |
| A | | | 1 h., 9% 1 h., 5.2% | | 2 h., 1.1% | | | |
| C | | | 17.3 | 19.6 | 20 | 8.8 | | |

We claim:
1. A compound of the formula

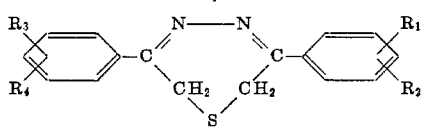

in which:

$R_1$ and $R_3$ are H or hydroxy;

$R_2$ and $R_4$ are halo, oxyalkylcarboxy in which the alkyl radical is of 1 to 4 carbon atoms, acetylamino, carboxymethyl or carboxyamino, $R_2$ and $R_4$ being oxyalkylcarboxy or acetylamino when $R_1$ and $R_3$ are H; and a pharmaceutically acceptable salt thereof.

2. A compound according to claim 1 in which $R_1$ and $R_3$ are hydrogen atoms and $R_2$ and $R_4$ each represent an oxyalkylcarboxylic group in which the alkyl radical has from 1 to 4 carbon atoms or an acetylamino radical located in the para position with respect to the carbon atom of the benzene ring connected to the heterocycle.

3. A compound according to claim 1, in which $R_1$ and $R_3$ are hydroxy groups located ortho or para with respect to the carbon atom of the benzene ring connected to the heterocycle and $R_2$ and $R_4$ each represent a halogen atom, a carboxymethyl radical or a carboxyamino radical located meta with respect to the carbon atom of the benzene ring connected to the heterocycle.